United States Patent
Zheng et al.

(10) Patent No.: US 8,717,347 B2
(45) Date of Patent: May 6, 2014

(54) ELECTROPHORETIC DISPLAY APPARATUS AND METHOD OF DATA TRANSFER THEREOF

(75) Inventors: Zao-Shi Zheng, Hsin-Chu (TW); Chih-Yen Chen, Hsin-Chu (TW); Chih-Wei Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 518 days.

(21) Appl. No.: 13/028,473

(22) Filed: Feb. 16, 2011

(65) Prior Publication Data

US 2011/0310082 A1    Dec. 22, 2011

(30) Foreign Application Priority Data

Jun. 21, 2010 (TW) ................. 99120156 A

(51) Int. Cl.
*G06F 3/038* (2013.01)
(52) U.S. Cl.
USPC .......................................... 345/212; 345/107
(58) Field of Classification Search
USPC ........................................................ 345/107
See application file for complete search history.

(56) References Cited

U.S. PATENT DOCUMENTS

| | | | |
|---|---|---|---|
| 2005/0180088 A1 | 8/2005 | Chiang et al. | |
| 2008/0143668 A1* | 6/2008 | Shin et al. | 345/107 |
| 2008/0266243 A1 | 10/2008 | Johnson et al. | |
| 2009/0315824 A1* | 12/2009 | Komatsu et al. | 345/107 |
| 2011/0011514 A1 | 1/2011 | Hashizume et al. | |

FOREIGN PATENT DOCUMENTS

| | | |
|---|---|---|
| TW | 200537426 A | 1/2005 |
| TW | I317034 | 2/2006 |
| WO | 2005073949 | 8/2005 |

OTHER PUBLICATIONS

Taiwan Office Action dated Jul. 18, 2013.

* cited by examiner

*Primary Examiner* — Amare Mengistu
*Assistant Examiner* — Joseph G Rodriguez
(74) *Attorney, Agent, or Firm* — McClure, Qualey & Rodack, LLP

(57) ABSTRACT

The electrophoretic display apparatus includes a first electrode layer, a second electrode layer, an electrophoresis layer, and a driving module. The driving module has an adsorption mode and a display mode. When an adsorption mode is activated, a first voltage difference is formed between the first electrode layer and the second electrode layer, resulting in electrostatic adsorption to reduce or eliminate the air gap between the second electrode layer and electrophoresis layer. When a display mode is activated, a second voltage difference is formed between the first electrode layer and the second electrode layer. The electrophoresis layer can sense the variation of electric field between the two electrode layers and start the operation of data transmission and display.

10 Claims, 5 Drawing Sheets

ELECTROPHORETIC DISPLAY APPARATUS AND METHOD OF DATA TRANSFER THEREOF

BACKGROUND OF THE INVENTION

1. Field of the Invention

The present invention relates generally to an electrophoretic display apparatus and a method of data transfer thereof; particularly, the present invention relates to an electrophoretic display apparatus capable of promoting data transfer and uniformity of displaying effect and a method of data transfer thereof.

2. Description of the Prior Art

Recently, in the tendency of pursuing thin, light-weighted electronic products, traditional cathode-ray tube displays have been gradually replaced by the flat display apparatus due to the advantages of small in volume, low power consumption, and so forth. Hence, the flat display apparatus has become the mainstream product in current display apparatus market.

There are a variety of flat display products. Among them, apparatuses which utilize liquid crystal display technique, such as computer display panels, liquid crystal televisions, etc, are more popular and widely applied. However, display products utilizing the electrophoresis technology such as e-paper, e-book, and touch panel are getting more and more attention and gradually marching toward production phase.

As shown in FIG. 1, a traditional electro-book display apparatus adopting the electrophoretic display technique has a first electrode layer 10, an electrophoresis layer 30, an adhesive layer 50, a second electrode layer 20, and a substrate 40. The electrophoresis layer 30 is disposed between the first electrode layer 10 and the second electrode layer 20 and attached to the first electrode layer 10 tightly. Meanwhile, the electrophoresis layer 30 is fixed on the second electrode layer 20 by the adhesive layer 50.

As shown in FIG. 1, the electrophoresis layer 30 includes a sealing layer 33 and an electrophoresis particle layer 31, wherein the electrophoresis particle layer 31 is right next to the first electrode layer 10. A plurality of electrophoresis particles 35 is dispersed in the electrophoresis particle layer 31. When a voltage difference exists between the first electrode layer 10 and the second electrode layer 20, the electrophoresis particles 35 begin to move under the influence of the electric field to accomplish the data transfer and display operation.

Due to the adhesive layer 50 in the electro-book apparatus, as shown in FIG. 1, the electrophoresis layer 30 can attach to the second electrode layer 20 tightly. Thus no air gap exists between the electrophoresis layer 30 and the second electrode layer 20. However, at the presence of process failure or any other factors which might lead to the formation of air gap between the electrophoresis layer 30 and the second electrode layer 20, the electric field between these two electrode layers will be smaller than the pre-determined value. Therefore, the motion of electrophoresis particles 35 will be influenced under such circumstances, further resulting in incompletion or lack of uniformity when transferring and displaying data.

In some designs, the electrophoresis layer 30 can be separated from the second electrode layer 20. The electrophoresis layer 30 and the second electrode layer 20 are attached to each other when data transfer is needed, and then voltage is applied to accomplish the data transfer operation. However, air gap is likely to be formed between the electrophoresis layer 30 and the second electrode layer 20 at the same time and results in incompletion or lack of uniformity when transferring and displaying data.

SUMMARY OF THE INVENTION

It is an object of the present invention to provide an electrophoretic display apparatus and a method of data transfer thereof which can avoid the formation of air gap between the electrophoresis layer and the second electrode layer.

It is another object of the present invention to provide an electrophoretic display apparatus and a method of data transfer thereof which can improve data transfer and uniformity of displaying effect.

The electrophoretic display apparatus of the present invention includes a first electrode layer, a second electrode layer, an electrophoresis layer, and a driving module. The electrophoresis layer is disposed between the first electrode layer and the second electrode layer and attached to the first electrode layer. The electrophoresis layer has a plurality of electrophoresis particles, wherein the moving direction of the electrophoresis particles is driven by the voltage difference between the first electrode layer and the second electrode layer. In this way, data transfer and display on the electrophoretic display apparatus can be achieved.

The driving module in the electrophoretic display apparatus has an adsorption mode and a display mode. When the adsorption mode is activated, the first voltage difference is formed between the first electrode layer and the second electrode layer, an electrostatic adsorption will therefore be produced between two electrode layers, preventing air gap from forming between the electrophoresis layer and the second electrode layer. When the display mode is activated, the second voltage difference smaller than the first voltage difference is formed between the first electrode layer and the second electrode layer. This results in electric field difference between the two electrode layers and drives the electrophoresis particles within the electrophoresis layer to move and further proceed to transfer and display data.

By applying the techniques of photolithography and physical or chemical vapor deposition, the second electrode layer can be realized as a plurality of thin film transistors and a plurality of pixel electrodes to form a thin film transistor array on the substrate. When the adsorption mode is activated, the first voltage difference is formed between the first electrode layer and the pixel electrode by the driving module; when the display mode is activated, the second voltage difference is formed between the first electrode layer and the pixel electrode by the driving module.

The method of data transfer of the electrophoretic display apparatus includes providing an electrophoretic display apparatus including a first electrode layer, a second electrode layer and an electrophoresis layer, wherein the electrophoresis layer is attached to the first electrode layer to locate the electrophoresis layer between the first electrode layer and the second electrode layer, and a gap layer exists between the electrophoresis layer and the second electrode layer. Afterward, a first voltage difference is applied between the first electrode layer and the second electrode layer to generate an electrostatic force, the electrophoresis layer is attracted to the second electrode layer tightly, thereby avoiding the forming of air gap in therebetween. A second voltage difference smaller than the first voltage difference is applied between the first electrode layer and the second electrode layer to drive electrophoresis particles in the electrophoresis layer to move correspondingly thereby accomplishing the data transfer and display.

Because prior to activating the display mode, the electrophoresis layer is tightly attached to the second electrode layer without air gap in therebetween by the electrostatic adsorption due to the activation of the adsorption mode, the electrophoretic display apparatus is able to achieve a better data transmission and a more uniform display at the display mode.

DETAILED DESCRIPTION OF THE PREFERRED EMBODIMENT

The present invention provides an electrophoretic display apparatus and a method of data transfer thereof. The electrophoretic display apparatus of the present invention includes a first electrode layer, a second electrode layer, an electrophoresis layer, and a driving module. The method of data transfer of the electrophoretic display apparatus includes performing the adsorption mode and the display mode of the driving module.

Figure 1:
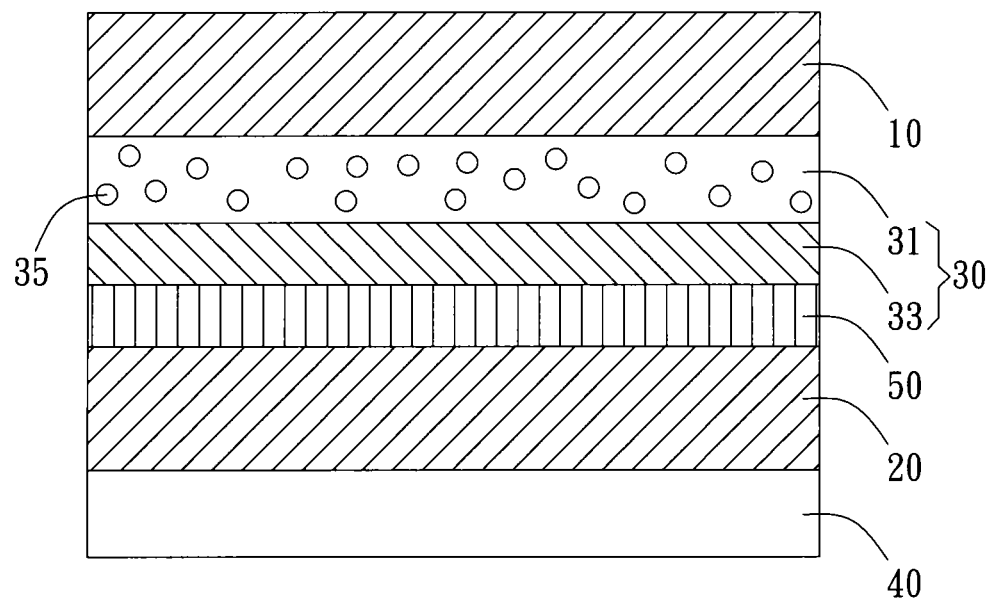
FIG. 1 shows a schematic view of a prior art electrophoretic display apparatus.
Figure 2A:
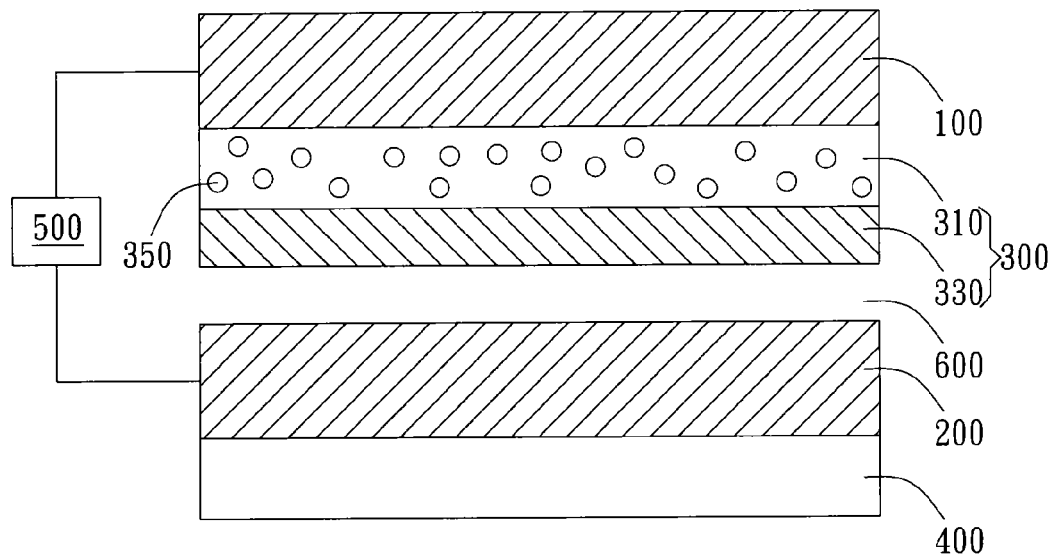
FIG. 2A is a cross-sectional view of the embodiment of the electrophoretic display apparatus of the present invention.

As an embodiment illustrated in FIG. 2A, an electrophoretic display apparatus includes a first electrode layer 100, a second electrode layer 200, an electrophoresis layer 300, and a driving module 500. The electrophoresis layer 300 is attached to the first electrode layer 100 and disposed between the first electrode layer 100 and the second electrode layer 200. Without applying voltage, a gap layer 600, such as an air gap (AG), may exist between the electrophoresis layer 300 and the second electrode layer 200. In a preferred embodiment, the first electrode layer 100 may be made of electrically conductive and transparent materials. For example, Indium Tin Oxide (ITO) is one of the common materials.

As illustrated in FIG. 2A, the electrophoresis layer 300 includes a electrophoresis particle layer 310 and a sealing layer 330, wherein the electrophoresis particle layer 310 is located between the first electrode layer 100 and the sealing layer 330. In addition, the electrophoresis particle layer 310 has a plurality of electrophoresis particles 350. The display capability of the electrophoretic display apparatus relies on the mobility of electrophoresis particles 350, and the mobility of the electrophoresis particles 350 is controlled under the variation of electric field between the first electrode layer 100 and the second electrode layer 200. As shown in FIG. 2A, in the electrophoresis layer 300 of the electrophoretic display apparatus, the electrophoresis particle layer 310 is sealed between the first electrode layer 100 and the sealing layer 330. In a preferred embodiment, the sealing layer 330 may be made of non-electric conductive materials, such as UV-curable epoxy, hot-melt adhesives, or thermoplastic elastomer.

Figure 2B:
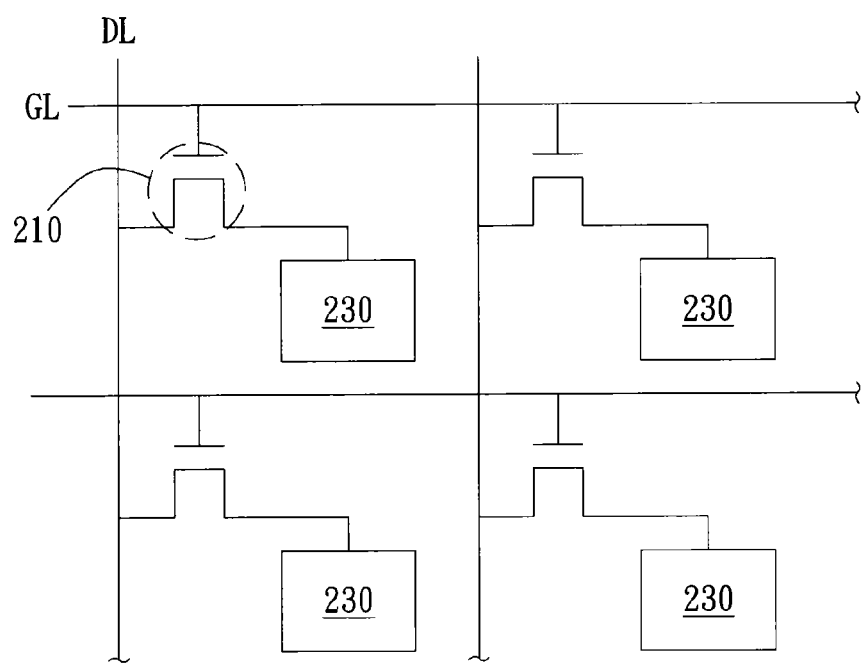
FIG. 2B is a top view of the embodiment of the second electrode layer of the present invention.

In the embodiment, the second electrode layer 200 is formed on the substrate 400 by physical or chemical vapor deposition and photolithography. As illustrated in FIG. 2B, the second electrode layer 200 includes a plurality of gate lines(GL), a plurality of data lines(DL), a plurality of thin film transistors 210 and a plurality of pixel electrodes 230, thus a thin film transistor array is formed on the substrate 400. In a preferred embodiment, the driving module 500 has two driving modes: adsorption mode and display mode. As illustrated in FIG. 2A, the driving module 500 is electrically connected to the first electrode layer 100 and a source node of the thin film transistor 210 of the second electrode layer 200. At the adsorption mode, a first voltage difference is applied between the first electrode layer 100 and the pixel electrode 230 by the driving module 500 to generate an electrostatic force between the two electrode layers so that the electrophoresis layer 300 tightly attaches to the pixel electrode 230 to reduce or eliminate the air gap. At the display mode, a second voltage difference smaller than the first voltage difference is applied between the first electrode layer 100 and the pixel electrode 230 by the driving module 500 to generate a voltage difference between the two electrode layers so that the movements of electrophoresis particles 350 in each pixel of the electrophoretic display apparatus can be manipulated to achieve data transmission and data display.

Figure 3A:
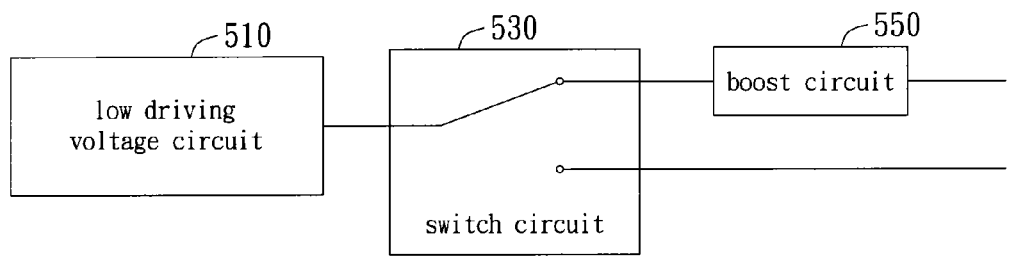
FIG. 3A shows the embodiment of the circuit combination at the adsorption mode.
Figure 3B:
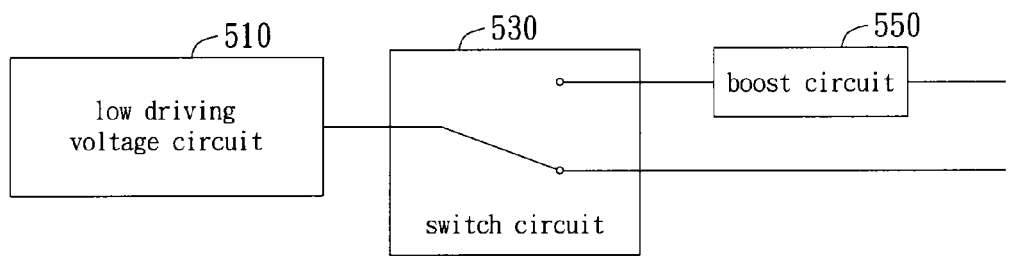
FIG. 3B show the embodiment of the circuit combination at the display mode.

In the embodiment, the driving module 500 includes a low driving voltage circuit 510, a switch circuit 530, and a boost circuit 550, wherein the electrical connection between the low driving voltage circuit 510 and the boost circuit 550 is controlled by the switch circuit 530. As illustrated in FIG. 3A, when the adsorption mode is activated, the low driving voltage circuit 510 couples to the boost circuit 550 through the switch circuit 530 to raise the voltage of the low driving voltage circuit 510, and the first voltage difference is applied between the two electrode layers. As illustrated in FIG. 3B, when the display mode is activated, the switch circuit 530 is operated in a manner that the low driving voltage circuit 510 bypasses from the boost circuit 550. Therefore, the voltage from the low driving voltage circuit 510 is not raised by the boost circuit 550 and the second voltage difference smaller than the first voltage difference is applied between the two electrode layers. However, in another embodiment, the driving module 500 may have a different circuit design which is capable of applying the first voltage difference and the second voltage difference smaller than the first voltage difference.

Figure 4A:
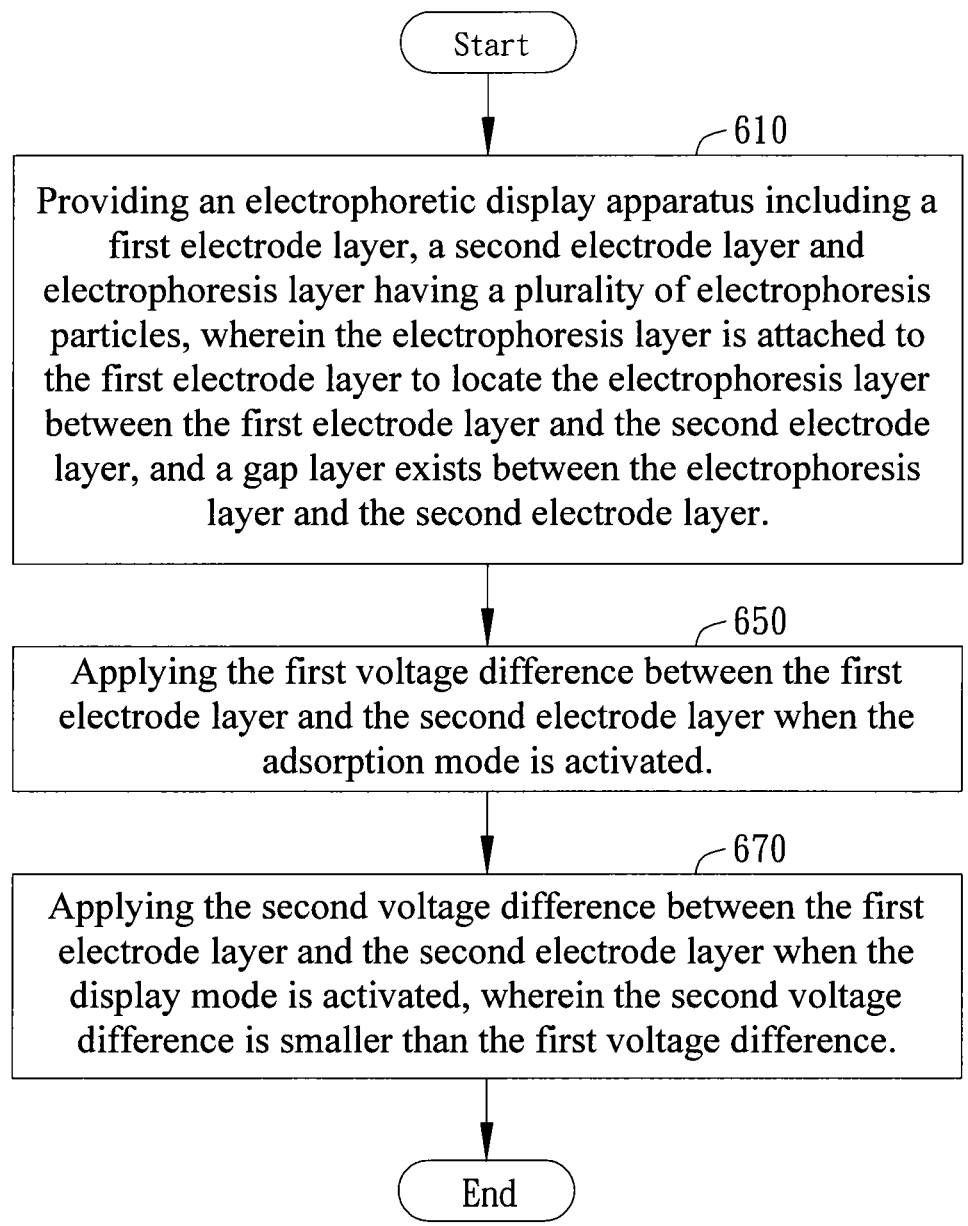
FIG. 4A is a flowchart of the embodiment of a method of data transfer of the electrophoretic display apparatus.

FIG. 4A is a flow chart of the method of data transfer of electrophoretic display apparatus. Step 610 includes providing an electrophoretic display apparatus including a first electrode layer 100, a second electrode layer 200 and an electrophoresis layer 300 having a plurality of electrophoresis particles 350, wherein the electrophoresis layer 300 is attached to the first electrode layer 100 to locate the electrophoresis layer 300 between the first electrode layer 100 and the second electrode layer 200, and a gap layer 600 exists between the electrophoresis layer 300 and the second electrode layer 200. This step provides the electrophoretic display apparatus, wherein the electrophoresis layer 300 is attached to the first electrode layer 100 to locate the electrophoresis layer 300 between two electrode layers. Thus, as data transfer of the electrophoretic display is finished, the electrophoresis layer 300 and the second electrode layer 200 can be separated, so that the user can only carry the electrophoresis layer 300 which is capable of displaying data and the first electrode layer 100. This can greatly improve the portability and convenience of the electrophoretic display apparatus. When the data displayed on the electrophoresis layer 300 and the first electrode layer 100 need to be refreshed, the user can attach the electrophoresis layer 300 tightly to the second electrode layer 200 to position the electrophoresis layer 300 between two electrode layers and begin the data transfer operation.

Step 650 includes applying the first voltage difference between the first electrode layer 100 and the second electrode layer 200 when the adsorption mode is activated. For example, in this step, the first voltage difference is applied between the first electrode layer 100 and the second electrode layer 200 to generate the electrostatic force so that the electrophoresis layer 300, which is attached to the first electrode layer 100, is tightly attracted to the second electrode layer 200 by the electrostatic force. According to step 650, air gap can be prevented from forming between the electrophoresis layer 300 and the second electrode layer 200 so as to improve the completion and uniformity of data transfer.

As the embodiment shown in FIG. 4A, the step 670 includes applying the second voltage difference between the first electrode layer 100 and the second electrode layer 200 when the display mode is activated, wherein the second voltage difference is smaller than the first voltage difference. For example, in this step, the second voltage difference is applied between the first electrode layer 100 and the second electrode layer 200 to result in voltage difference, thus electric field between the two electrode layers is formed. The motions of the electrophoresis particles 350 in the electrophoresis layer 300 are manipulated by the variation of electric field between the two electrode layers to achieve data transmission and data-displaying. This step is preferably performed after the step 650 to ensure that the electrophoresis layer 300 is tightly attached to the second electrode layer 200 without air gap in between. Under such circumstances, better uniformity can be achieved in transferring and displaying data while the step 670 is performed.

Figure 4B:
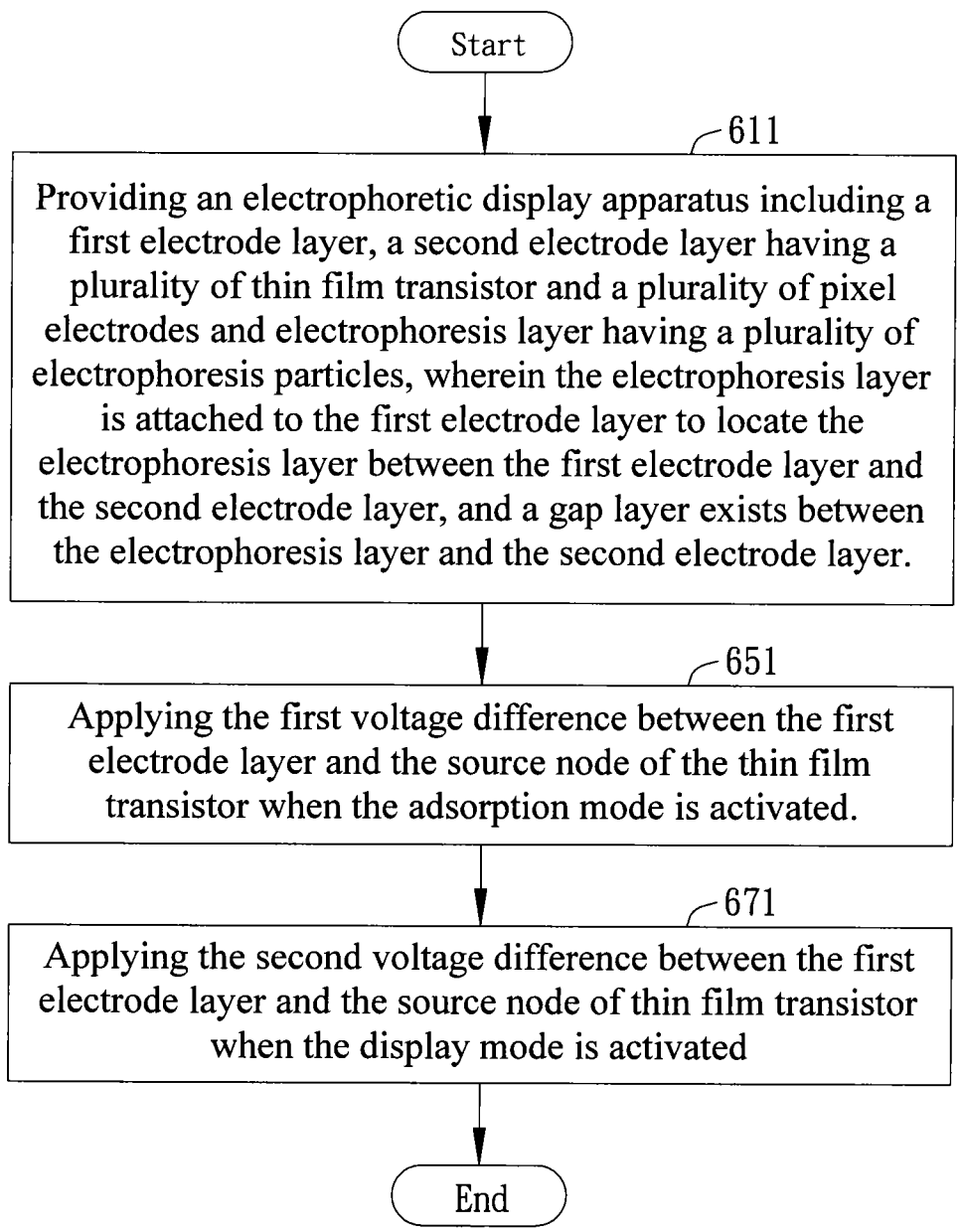
FIG. 4B is a flowchart of another embodiment of a method of data transfer of the electrophoretic display apparatus.

As another embodiment shown in FIG. 4B, the step 611 includes providing an electrophoretic display apparatus including a first electrode layer 100, a second electrode layer 200 having a plurality of thin film transistor 210 and a plurality of pixel electrodes 230, and an electrophoresis layer 300 having a plurality of electrophoresis particles 350, wherein the electrophoresis layer 300 is attached to the first electrode layer 100 to locate the electrophoresis layer 300 between the first electrode layer 100 and the second electrode layer 200, and a gap layer 600 exists between the electrophoresis layer 300 and the second electrode layer 200. This step provides the electrophoretic display apparatus having a plurality of thin film transistors 210 and a plurality of pixel electrodes 230, and it results in a thin film transistor array to control the voltage of pixel electrode 230.

The step 651 includes applying the first voltage difference between the first electrode layer 100 and the source node of the thin film transistor 210 when the adsorption mode is activated. The step 651 is to apply the first voltage difference between the first electrode layer 100 and a source node of thin film transistor 210 to induce voltage difference between the first electrode layer 100 and the pixel electrode 230. This results in the electrostatic adsorption to attach the electrophoresis layer 300 to the pixel electrode 230 tightly and thus avoids the chance of forming air gap in between.

As FIG. 4B shows, the step 671 includes applying the second voltage difference between the first electrode layer 100 and the source node of thin film transistor 210 when the display mode is activated. The step 671 is to apply the second voltage difference, which is smaller than the first voltage difference, between the first electrode layer 100 and the source node of thin film transistor 210. This results in inducing electric field between the first electrode layer 100 and the pixel electrode 230 in order to manipulate the motions of the electrophoresis particles 350 in the electrophoresis layer 300 and achieves the data transmission and data display.

In this preferred embodiment, the second voltage difference applied by the driving module 500 of the electrophoretic display apparatus at the display mode needs to induce enough electric field between the first electrode layer 100 and the second electrode layer 200, enabling a full-control of electrophoresis particles 350 to move to their expected locations. The preferred range of the second voltage difference applied by the driving module 500 is 10~15 volts.

In a preferred embodiment, the first voltage difference applied by the driving module 500 of the electrophoretic display apparatus at the adsorption mode needs to induce enough electrostatic adsorption between the first electrode layer 100 and the second electrode layer 200, enabling a tight attachment of the electrophoresis layer 300 to the second electrode layer 200 to avoid air gap formed in between. Therefore, in this embodiment, when the first voltage difference applied by the driving module 500 is greater than 15 volts, the electrophoresis layer 300 can attach to the second electrode layer 200. When the first voltage difference applied by the driving module 500 ranges from 150~200 volts, the attachment of the electrophoresis layer 300 to the second electrode layer 200 is better achieved.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrophoretic display apparatus, comprising:
   a first electrode layer;
   a second electrode layer;
   an electrophoresis layer attached to said first electrode layer and disposed between said first electrode layer and said second electrode layer, wherein a gap layer exists between said electrophoresis layer and said the second electrode layer; and
   a driving module electrically connecting to said first electrode layer and said second electrode layer and having an adsorption mode and a display mode,
   wherein when said adsorption mode is activated, a first voltage difference is formed between said first electrode layer and said second electrode layer to reduce said gap layer between said electrophoresis layer and said second electrode layer; and when said display mode is activated, a second voltage difference is formed between said first electrode layer and said second electrode layer to perform data transfer on said electrophoresis layer, wherein said first voltage difference is greater than said second voltage difference.

2. The electrophoretic display apparatus of claim 1, wherein said first voltage difference is greater than 15 volts.

3. The electrophoretic display apparatus of claim 1 wherein said second electrode layer has a plurality of thin film transistors and a plurality of pixel electrodes, wherein said driving module provides said first voltage difference and said second voltage difference between the first electrode layer and a source node of the thin film transistor.

4. The electrophoretic display apparatus of claim 1, wherein said driving module has a low driving voltage circuit, a boost circuit, and a switch circuit.

5. The electrophoretic display apparatus of claim 4, wherein when said adsorption mode is activated, said switch circuit connects said low driving voltage circuit to said boost circuit, and said first voltage difference is formed between said first electrode layer and said second electrode layer; when said display mode is activated, said switch circuit disconnects said low driving voltage circuit from said boost circuit, and said second voltage difference is formed between said first electrode layer and said second electrode layer.

6. A method of data transfer of an electrophoretic display apparatus, comprising:
providing the electrophoretic display apparatus including a first electrode layer, a second electrode layer and an electrophoresis layer having a plurality of electrophoresis particles, wherein said electrophoresis layer is attached to said first electrode layer to locate said electrophoresis layer between said first electrode layer and said second electrode layer, and a gap layer exists between said electrophoresis layer and said second electrode layer;
applying a first voltage difference between said first electrode layer and said second electrode layer to reduce said gap layer between said electrophoresis layer and said second electrode layer when an adsorption mode is activated; and
applying a second voltage difference between said first electrode layer and said second electrode layer to perform data transfer on said electrophoresis layer when a display mode is activated, wherein said second voltage difference is smaller than said first voltage difference.

7. The method of claim 6, wherein said first voltage difference is higher than 15 volts.

8. The method of claim 6, wherein said step of providing the electrophoretic display apparatus includes providing said electrophoretic display apparatus having a plurality thin film transistors and a plurality of pixel electrodes in said second electrode layer.

9. The method of claim 8, wherein said step of applying the first voltage difference includes applying said first voltage difference between said first electrode layer and the pixel electrode.

10. The method of claim 8, wherein said step of applying the second voltage difference includes applying said second voltage difference between said first electrode layer and the pixel electrode.

* * * * *